(12) United States Patent
Lorig

(10) Patent No.: US 10,165,759 B2
(45) Date of Patent: Jan. 1, 2019

(54) VP TRAINER

(71) Applicant: Stephen A Lorig, Whippany, NJ (US)

(72) Inventor: Stephen A Lorig, Whippany, NJ (US)

( * ) Notice: Subject to any disclaimer, the term of this patent is extended or adjusted under 35 U.S.C. 154(b) by 103 days.

(21) Appl. No.: 14/604,564

(22) Filed: Jan. 23, 2015

(65) Prior Publication Data

US 2018/0014507 A1 Jan. 18, 2018

(51) Int. Cl.
*A01K 15/02* (2006.01)

(52) U.S. Cl.
CPC .......... *A01K 15/027* (2013.01); *A01K 15/026* (2013.01)

(58) Field of Classification Search
CPC .. A01K 15/025; A01K 15/026; A01K 15/027; A63B 2069/0008; A63B 2208/12
USPC ................. 119/708, 707, 711, 702, 712, 905
See application file for complete search history.

(56) References Cited

U.S. PATENT DOCUMENTS

| | | | | |
|---|---|---|---|---|
| 4,712,510 A * | 12/1987 | Tae-Ho | ................ | A01K 15/025 119/708 |
| 4,940,018 A * | 7/1990 | Edling | ................ | A01K 15/025 119/708 |
| D318,149 S * | 7/1991 | Young | .......................... | D30/156 |
| 5,941,196 A * | 8/1999 | Domanski | ............ | A01K 15/025 119/708 |
| 6,843,158 B2 * | 1/2005 | Garcia | ................... | A01K 15/02 102/403 |
| 7,115,051 B2 * | 10/2006 | Hansberry | ......... | A63B 69/0002 473/423 |
| 7,198,008 B2 * | 4/2007 | Poyner | ................. | A01K 15/027 119/701 |
| D547,013 S * | 7/2007 | Tsengas | ....................... | D30/160 |
| 7,334,541 B2 * | 2/2008 | Reiter | .................... | A01K 15/02 119/712 |
| 8,181,606 B1 * | 5/2012 | Kirschbaum | ........ | A01K 15/025 119/707 |
| 8,997,695 B2 * | 4/2015 | Riding | ................. | A01K 15/025 119/707 |
| 9,004,013 B2 * | 4/2015 | Bianchi | .................. | A01K 15/02 119/51.01 |
| 9,545,081 B2 * | 1/2017 | Nolan | ..................... | A01K 15/02 |
| 9,814,215 B2 * | 11/2017 | Renforth | .............. | A01K 15/025 |
| 9,897,419 B1 * | 2/2018 | Reynolds | .............. | F41H 11/132 |
| 2005/0150468 A1 * | 7/2005 | Fleischhacker | ...... | A01K 15/025 119/708 |
| 2007/0289550 A1 * | 12/2007 | Huang | ................. | A01K 15/025 119/707 |
| 2009/0205580 A1 * | 8/2009 | Tiefel | .................... | A01K 15/025 119/708 |
| 2013/0053188 A1 * | 2/2013 | Moore | ................. | A63B 63/083 473/423 |

* cited by examiner

*Primary Examiner* — Yvonne R Abbott-Lewis

(57) ABSTRACT

A novel vp trainer for training and exercising dogs without the need for dog ever leaving a predetermined radius is disclosed herein. The vp trainer includes a telescopic pole, a handle grip on one end and a clip on the other end to attach a tug or an animal attachment such as a bird. For connecting to the telescopic pole, a tether is used inside the tug and animal attachments for integrity and durability.

12 Claims, 5 Drawing Sheets

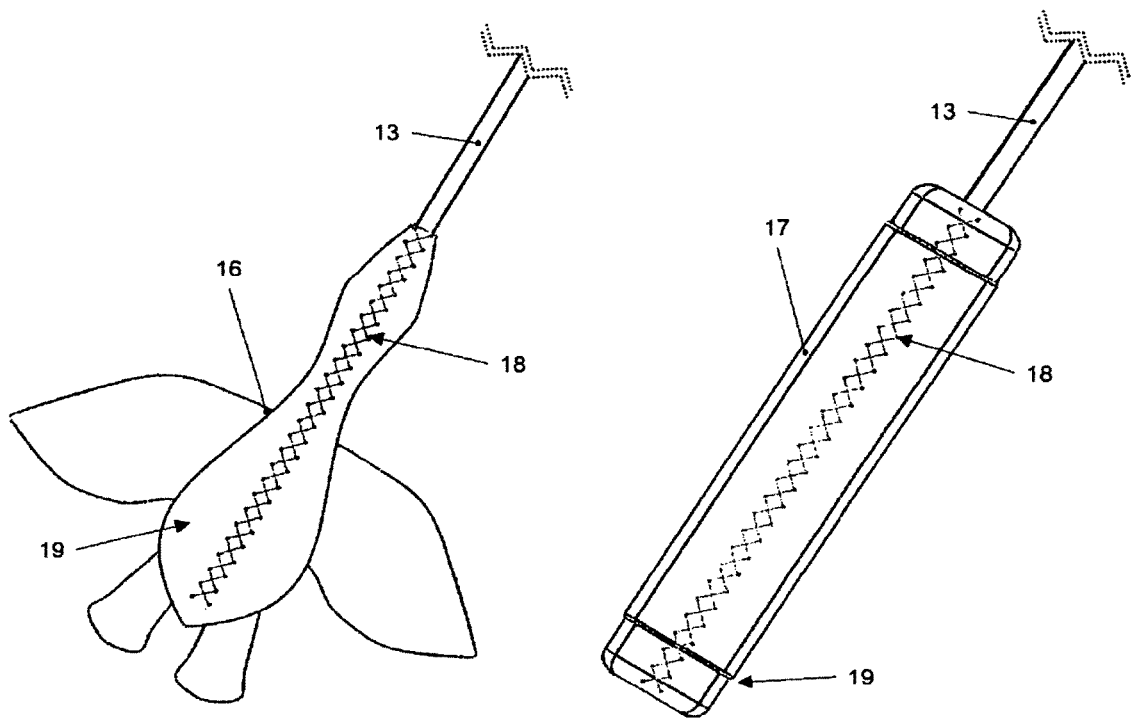

VP TRAINER

CROSS-REFERENCE TO RELATED APPLICATIONS

This application claims the benefit of priority of U.S. Provisional Application No. 61/955,139 filed on Mar. 18, 2014, all of which application is incorporated herein by reference in its entirety for all purposes.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

TECHNICAL FIELD

The present invention relates generally to dog training and exercising. Stated more particularly, disclosed herein is a durable and effective device which is directed to training dogs how to hunt, do variety of tasks at any age and exercise them without the need of having a large open area.

BACKGROUND OF THE INVENTION

Many people are attracted by kittens and puppies, who are cute, curious, playful and fun to watch. Kittens and puppies literally bounce around a house, chasing shadows, falling off furniture, jumping sky-high at unexpected sounds and finally collapse in exhaustion in their owners' laps for a well deserved rest. Just like babies, pets develop their own personalities as they mature. And just like parents, pet owners begin to love them even when they have outgrown their cute, small stage.

Even fully mature dogs still like to play, because like people they become bored with the daily routine. Dogs enjoy playing games like fetch even well into their advanced years. They must also be walked in order to maintain health and burn off energy. However, often a large expanse of ground is unavailable in which to walk the dog, especially while traveling.

The vp trainer is designed as a toy that would provide dogs with hours of fun and exercise, as well as effective training by their owners or trainers. A pet could receive a good workout in a playful manner while chasing a toy on the end of a tether attached to the end of the telescopic pole. The owner or trainer would also be entertained and could have fun interacting with his pet without even having to get up from his chair. It would also enable the user to keep the dog within a given radius, which would comply with local leash laws. In addition, it would also be ideal for exercising the pet when there is little room to run, such as when preparing for an airline ride. Furthermore, the vp trainer would help a dog relieve stress anxiety and nervous energy, especially when traveling on an airplane, bus, train or car, or even in a public place.

Moreover, it would also enable the owner or trainer to train the dog in retrieval of animals and birds, with the use of proper scented items inside the inner pouch in the tug or animal attachment or any object deemed necessary. Furthermore, similar to using scents inside the tug or animal attachment or any object deemed necessary for training, this would be an effective method for training dogs for drugs and explosives detection.

The inner pouch, inside the tug or animal attachment or any object deemed necessary, will have a Velcro locking mechanism. This will ensure the inside contents, whether its chemicals or drugs or small objects or any sizeable objects, be safely secured inside the pouch. In addition the Velcro locking mechanism is gentle enough so that the dog's teeth will be protected but strong enough that the dog will not come in contact with the inside items.

Numerous types of devices have been developed and used to play with, train and exercise pets; however these devices have various disadvantages. They are complicated, have many moving parts, and need instructions in order to assemble and function. Other than used for play, most have little or no useful training and exercising methods. Further, none claim an effective training and scent integrated inner-pouch method to train a dog to hunt animals, to train a dog for police and military needs, and even training for puppies.

To list a few examples, U.S. Pat. No. 3,295,499 to Manchester presents a stationary spring where the action toy is attached to a small hanging arch. When the object is attacked by the animal the object springs back and forth by the use of a rubber band. This toy is mostly directed at cats and has very little value in exercising the animal. No effective training method is claimed.

Another example is in U.S. Pat. No. 4,712,510 to TaeHo, here a stationary animal toy has limited cardiovascular exercise ability, is only restricted to amusement toys, and mostly directed as cat toys. No effective training methods is claimed.

The last example is in U.S. Pat. No. 5,467,740 to Redwine, where a hand held telescopic pole with a reel assembly is used to cast a training object connected via a line and is designed for both dogs and cats. However the reel, just like in a fishing reel can get tangled, and the line in itself is not durable nor strong for use in dog training. Additionally, the training methods claimed are not effective in training dogs to hunt animals and birds, train dogs for drug and explosives detection, using novel scent method such as described in the present invention.

The present invention fulfills the need for a principal training and exercising device for dogs that will effectively, not only exercise them in a limited amount of space, but also train them in a variety of ways, such as training a dog in retrieval, training to hunt for animals and birds, and drugs and explosives detection. The novel inner pouch will have a Velcro lock mechanism in order to secure the scent items inside the pouch. The novel inner pouch is used to place a scent inside the tug or animal attachment or whatever object is deemed necessary, whether of animal or bird or drugs or explosives, this will ensure an effective training method for the dog, not only visual but scent integrated.

SUMMARY OF THE INVENTION

The present invention is founded on the basic object of allowing a dog owner to interact with his or her pet without the dog leaving a predetermined radius. Additionally, the present invention will allow a variety of training and exercising endeavors.

An underlying object of the invention is to provide a device that is simple but yet effective in training and exercising dogs.

A further object of the invention is to provide a device that will enable the owner or trainer to train and exercise the dog in a confined space when large amounts of room are unavailable.

Another object of the invention is to provide a device that is soft yet durable for a dog to bite into and not break the dog's teeth nor the object.

Still another object of the invention is to provide a device that will enable a dog owner or trainer to effectively train a dog at any age to learn how to hunt specific animals with the help of using the inner pouch inside the tug and animal attachments to insert scents for specific animal.

Additionally, another object of the invention is to provide a device that will enable a dog owner or trainer to effectively train a dog using the inner pouch inside the tug and animal attachments for drug and explosives detection training.

Furthermore, another object of the invention is to provide a device that will enable a dog owner or trainer to effectively train a dog using any object deemed necessary for the training, other than a tug or animal attachment.

BRIEF DESCRIPTION OF THE DRAWINGS

FIGS. 6 and 7 show top views of two dog training objects with internal stitching shown.

DETAILED DESCRIPTION OF THE INVENTION

Figure 1:
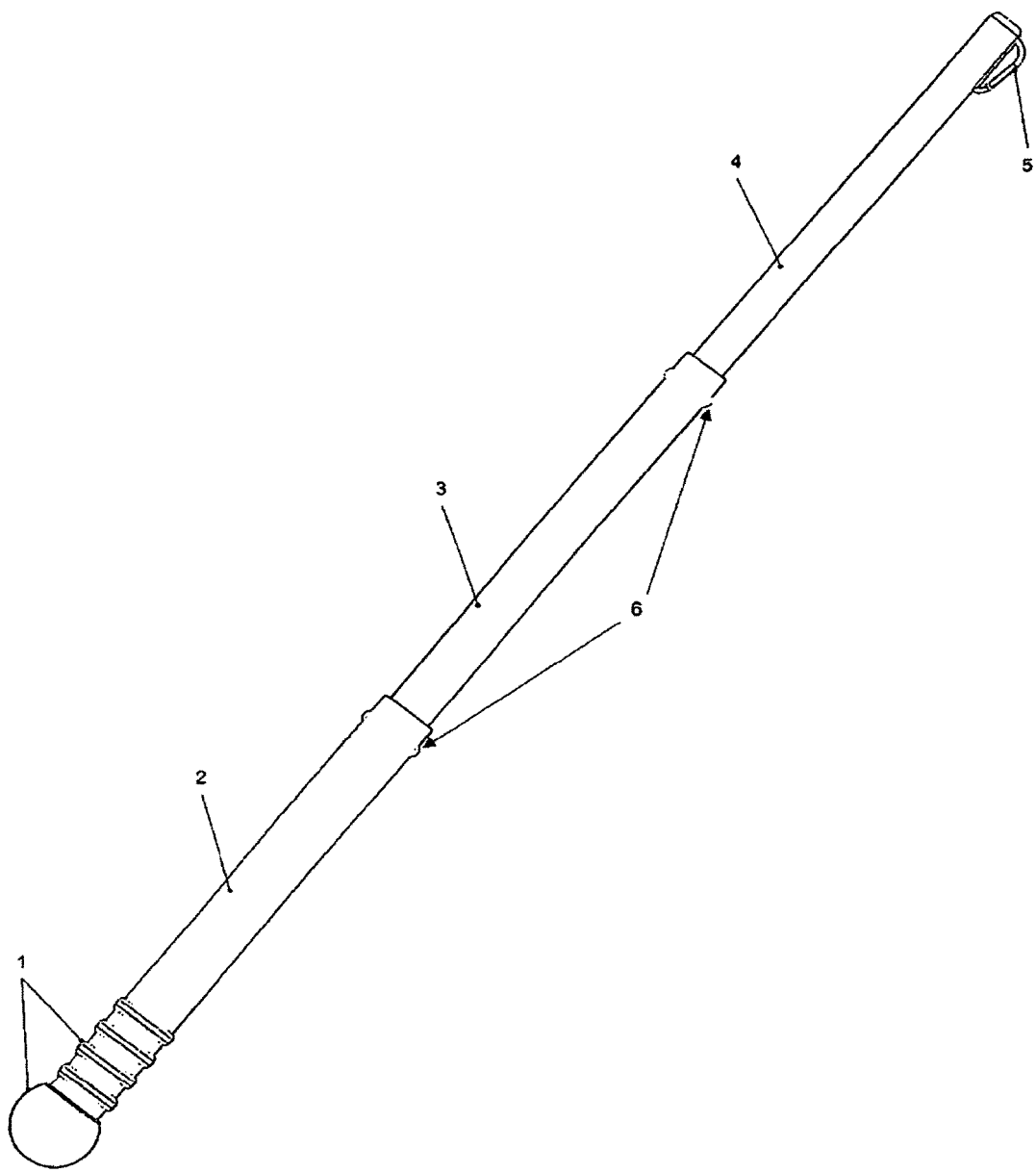
FIG. 1 is a perspective view of the telescopic pole extended, with the grip and the clip attached.

Referring now to the invention, FIG. 1 shows the telescopic pole in full extended position, with the three sections 2, 3 and 4. At one end the pole has a grip handle 1 which is rounded off at the end in case of accidental contact with an animal or body part, and at the other end a clip 5. Training objects such as a bird 16 and tug 17 shown in FIG. 6 and FIG. 7 can be attached to the clip 5, via the loop 15 in the tether 13, which the end of the tether is stitched to itself 14 which provides durability and strength during training and exercising when the dog will pull hard on the object.

Figure 2:
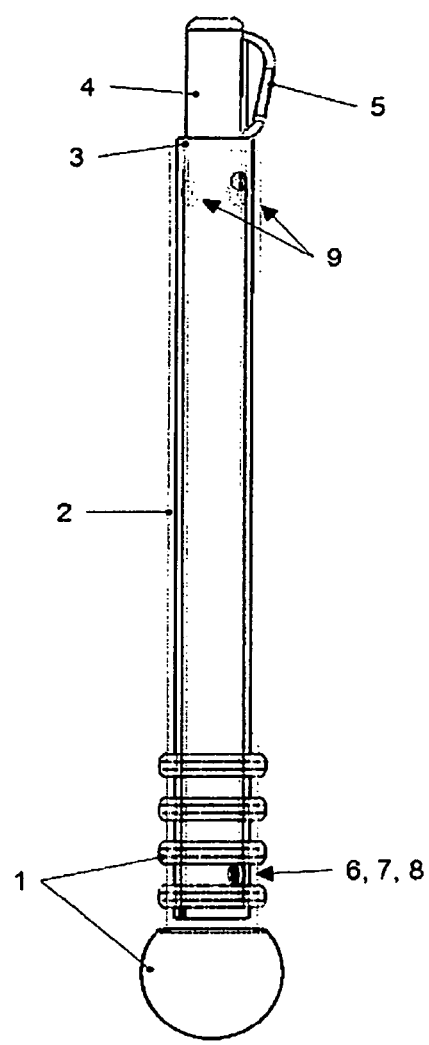
FIG. 2 is a perspective view of the telescopic pole in retracted position.

Still referring to the invention, in further detail, FIG. 2 shows the telescopic pole in full retracted position, where the inner pole sections 3 and 4 can be seen inside the first section 2. The locking holes 9, the spring 7 and ball 6 locking mechanism along with the locking hole 8 are shown with arrows.

Figures 3, 4:
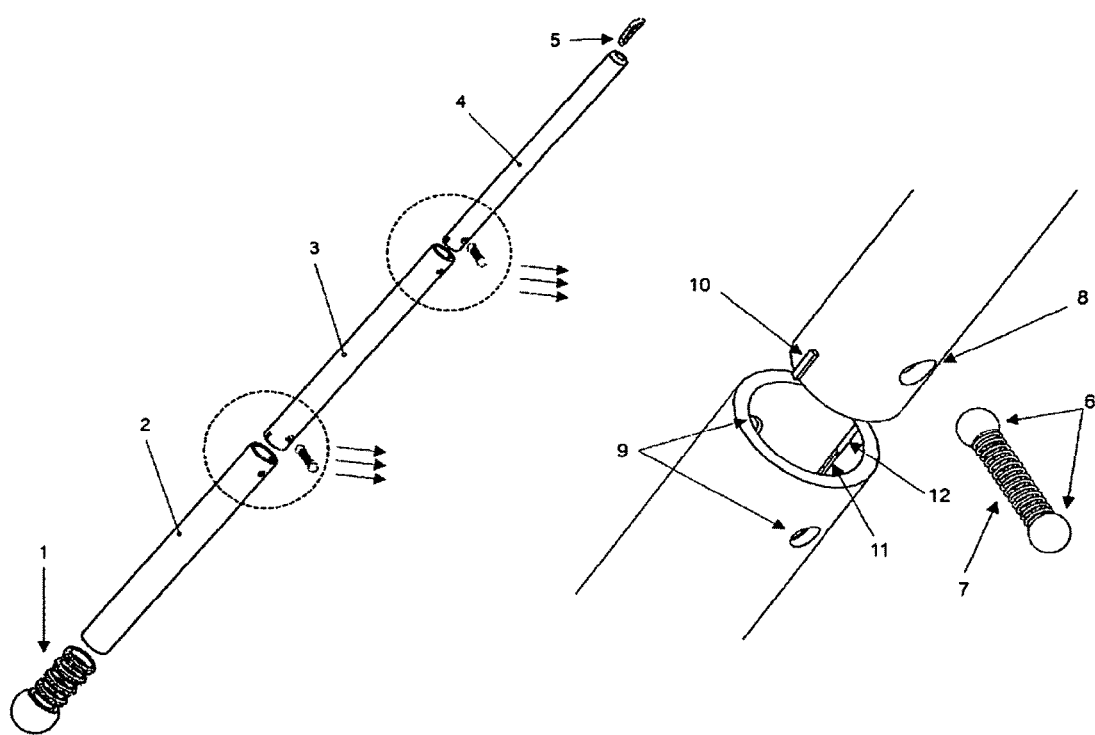
FIG. 3 is an exploded view of the telescopic pole, grip handle and clip and internal locking mechanism.
FIG. 4 shows a zoomed in view of the circular sections from FIG. 3.
Figure 5:
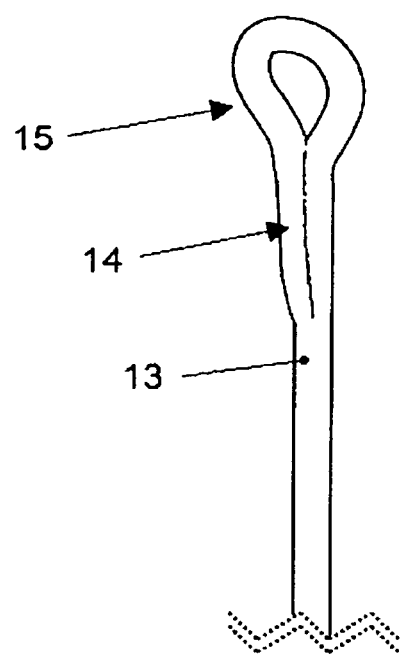
FIG. 5 shows the loop end of the tether.

In further detail, construction details of the invention in FIG. 3 shows an exploded view of the telescopic pole and its components, such as the grip handle 1, three pole sections 2, 3, and 4, the clip 5, and dashed lines point towards FIG. 4 which shows a more detail view of the dashed area. The locking mechanism 6, 7 is comprised of spring 7 and ball bearings 6 which are attached together to form a single piece and will be inserted into the locking holes 8 at the bottom of the upper two pole pieces 3 and 4. When the telescopic pole is extended the locking mechanism 6, 7 will lock into the locking holes 9 which are located at the bottom of the two lower poles 2 and 3. The telescopic poles will extend and retract via a track 11 inside the two lower poles 2 and 3, the two upper poles 3 and 4 at the bottom have a notch 10 which will guide the poles via the track 11 and a stopper 12 will make sure that the telescopic pole will not extend beyond a certain limit. The notch 10 will be magnetized as well as the bottom of each track 11 in the two lower poles 2 and 3, so that when fully retracted, as shown in FIG. 2, the telescopic pole will stay retracted unless extended by the user.

Still referring to the invention, FIG. 6 and FIG. 7 show a bird 16 and a tug 17 attachments with inner view of the attachment to the tether 13. The tether 13 will be attached to the training objects via a stitching method 18 inside the objects via the entire length of the training objects as seen in FIG. 6 and FIG. 7. This stitching 18 will ensure durability and strength during when the dog will bite onto training object. A leather pouch (not pictured) with a Velcro lock mechanism will be used inside the objects 19 for scent insertion. The scent will depend on the type of training desired.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A hand held vp trainer for training and exercising dogs of all ages and sizes by an owner or trainer, comprising:
    (a) a flexible yet robust, telescopic pole having lower, middle, and upper telescopic sections for extending or collapsing the pole, the pole having a grip handle attached to the base of the pole along with a rounded off base segment of the pole;
    (b) a clip attached to the pole near the other end farthest away from the handle, where a tether from a training and exercising object can be attached;
    (c) two locking mechanisms, where in each comprises a spring and two ball bearings for locking the lower, middle, and upper telescopic sections in place when expanded;
    (d) a track inside the lower and middle telescopic pole sections, and a notch on the bottom of the middle and upper telescopic pole sections, for guidance when expanding or collapsing the pole;
    (e) a stopper inside the lower and middle telescopic pole sections, to make sure that the telescopic pole will not extend beyond a certain limit;
    (f) magnetized notches on the bottom of the middle and upper telescopic pole sections, and magnetized bottom tracks inside of the lower and middle telescopic pole sections, so when the telescopic pole is collapsed it will stay collapsed and not extend on its own, unless extended by the owner or trainer; and
    (g) a plurality of training and exercising objects attractive to the dog and suitable for the training needed; and
    (h) a tether which connects the plurality of training and exercising objects to the telescopic pole.

2. The vp trainer according to claim 1, including a plurality of interchangeable and different objects which are connected to the clip, including one of a tug, animal object, bird object, or any objects deemed necessary.

3. The vp trainer according to claim 2, including an inner pouch inside the dog training and exercising objects for adding scents, in order to effectively train the dog to hunt various animals and birds, and to effectively train the dog in drug and explosives detection.

4. The vp trainer according to claim 2, including an inner pouch which will have a locking mechanism made of Velcro, in order to protect the dog's teeth, ensure that inner items such as small objects or chemicals or drugs will be safely secured inside the pouch, and to ensure the dog will not consume the inner contents.

5. The vp trainer according to claim 1, wherein the tether is made of robust leather or nylon to increase in durability and endurance when the dog will bite and pull on the objects.

6. The training and exercising method for training and exercising dogs of all ages and sizes by an owner or trainer, comprising the steps of:
   (a) providing a flexible yet robust, telescopic pole, having lower, middle, and upper telescopic sections, having a grip handle attached to the base of the pole along with a rounded off base segment of the pole and a clip attached to the pole near the other end farthest away from the handle, where a tether from a training and exercising object can be attached;
   (b) locking mechanisms, where in each comprises a spring and two ball bearings for locking the three telescopic sections in place when expanded, with a track inside the lower and middle telescopic pole sections, and a notch on the bottom of the middle and upper telescopic pole sections, for guidance when expanding or collapsing the pole;
   (c) attaching a tether with the loop end to the clip on the telescopic pole, with an animal or a bird object, where in set object includes inner pouch, attached to the other end of the tether line;
   (d) placing a scent of an animal or a bird, inside the inner pouch in the training object and locking it with a Velcro mechanism; and
   (e) in a predetermined area, allowing the dog to chase and bite the object for as long as necessary, and if applicable reward the dog with a treat.

7. The training and exercise method according to claim 6, including the step of using a tug, animal object, bird object, or any object deemed necessary, and placing a scent or if applicable an item of drugs, to train the dog for detection of drugs.

8. The training and exercising method according to claim 7, including the step of using animal or bird scent or scented objects inside the pouch.

9. The training and exercising method according to claim 6, including the step of using a tug, animal object, bird object, or any object deemed necessary, and placing a scent or if applicable an item of explosives, to train the dog for detection of explosives.

10. The training and exercising method according to claim 9, including the addition of two decoy object attachments without any scent, and the dog will have to choose the correct object having a scent or if applicable an item of explosives, to train the dog for detection of explosives.

11. The training and exercising method according to claim 9, including the step of using animal or bird scent or scented objects inside the pouch.

12. The training and exercising method according to claim 7, including the addition of two decoy object attachments without any scent, and the dog will have to choose the correct object having a scent or if applicable an item of drugs, to train the dog for detection of drugs.

* * * * *